S. MÁYER.
CUSPIDOR.
APPLICATION FILED MAY 8, 1914.
1,105,362.
Patented July 28, 1914.
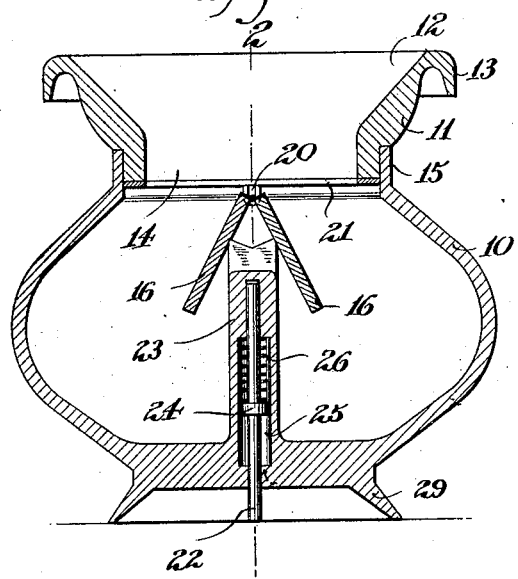
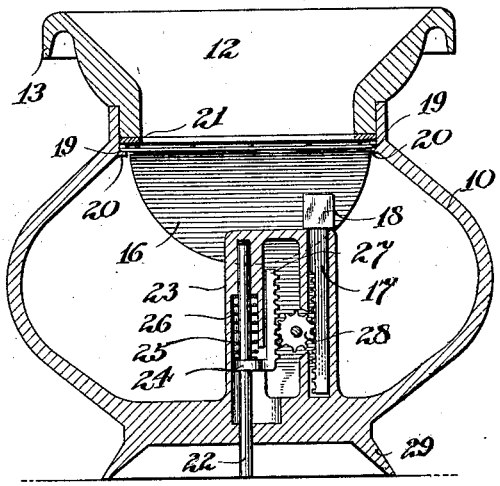
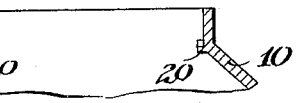
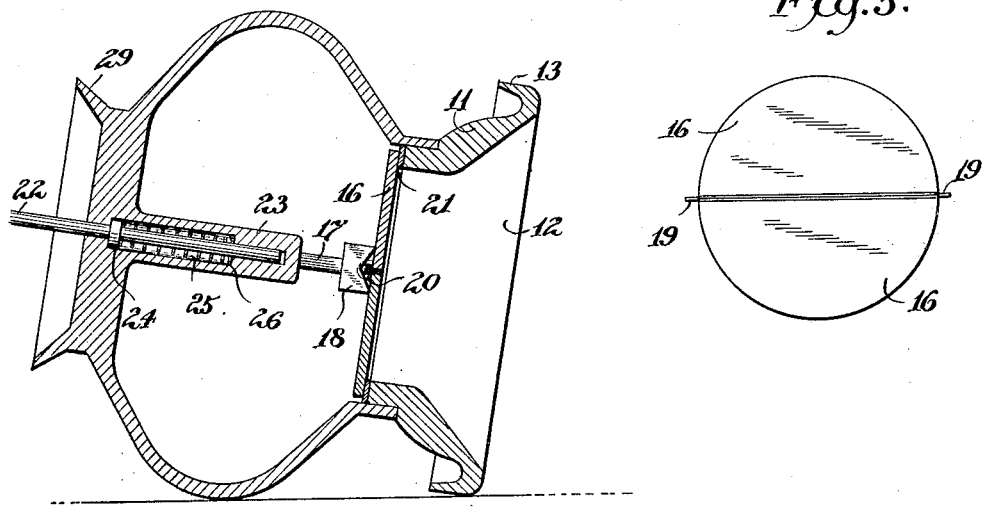
WITNESSES
INVENTOR
Steven Máyer
BY
ATTORNEYS

UNITED STATES PATENT OFFICE.

STEVEN MÁYER, OF NEW YORK, N. Y.

CUSPIDOR.

1,105,362.  Specification of Letters Patent.  Patented July 28, 1914.

Application filed May 8, 1914.  Serial No. 837,137.

*To all whom it may concern:*

Be it known that I, STEVEN MÁYER, a subject of the Emperor of Austria-Hungary, and a resident of the city of New York, borough of the Bronx, in the county of Bronx and State of New York, have invented a new and Improved Cuspidor, of which the following is a full, clear, and exact description.

Among the principal objects which the present invention has in view are: to provide a cuspidor with means for preventing the spilling or accidental ejection of the contents thereof; to provide means for automatically closing the cuspidor when out of its service position; and to provide means for closing the cuspidor, which means is readily removable to facilitate the cleaning of the utensil.

*Drawings.*—Figure 1 is a vertical section of a cuspidor constructed and arranged in accordance with the present invention, said cuspidor being shown in its service position; Fig. 2 is a vertical section of the same, the section being taken on the line 2—2 in Fig. 1; Fig. 3 is a section showing the cuspidor in an overturned position and the automatic closing mechanism as functioning; Fig. 4 is a detail view on an enlarged scale showing the neck fragment of the body of the cuspidor; Fig. 5 is a view showing the double-leafed closure cover with which the cuspidor is provided.

*Description.*—The bowl 10 and the pan 11 are constructed from any suitable material. The pan 11 has a flared rim 12, the edge 13 whereof is overturned in the manner shown. The pan 11 is provided with a relatively contracted neck 14, the outer surface whereof is recessed or rabbeted to be inserted within the neck 15 formed on the bowl 10. The fit of the neck 14 and the neck 15 is such as to overcome the tendency of the same to separate.

While I have herein shown the necks as having straight engaging surfaces, it will be understood that a screw-thread or other suitable means may be employed for holding the members in service relation. The pivotally-connected leaves 16 form a cover for the bowl 10 and an effectual closure member for the neck 14 when moved thereto by the plunger 17 and head 18 thereof. The leaves 16 are pivotally united by a shaft 19, the ends whereof protrude, as shown in Fig. 5 of the drawings, and rest in two oppositely-disposed saddles 20, which saddles are cast, pressed, or otherwise formed in the structure of the bowl 10 and at the base of the neck 15 thereof. The saddles 20 are normally closed by the lower edge of the neck 14 and a gasket 21 with which the lower edge of said neck 14 is provided. The gasket 21 forms a cushion upon which the leaves 16 strike, and against which, in service, they are pressed by the plunger 17 and head 18 whenever the cuspidor is dislodged from its service position.

When in service, a cuspidor thus constructed rests partly on the plunger 22. The plunger 22 is guided in perforations formed in the bottom of the bowl 10, and in the top of a housing 23. Intermediate the ends of the plunger, a disk 24 is rigidly mounted thereon. Interposed between the disk 24 and the upper end of a socket 25 is a spring 26, the operation whereof, when not restrained, is to move the disk 24 to the bottom of the socket 25, as shown best in Fig. 3 of the drawings.

The disk 24 supports a rack bar 27, the teeth whereof are engaged with the teeth of a small pinion 28. The teeth of the pinion 28 are meshed with the rack toothed section of the plunger 17, at the upper end whereof the head 18 is disposed.

From the foregoing it will be seen that when the spring 26 is permitted to extend the plunger 22 beyond the rim bottom 29 of the cuspidor, as shown in Fig. 3 of the drawings, the rack bar 27 is depressed, thereby rotating the pinion 28 and lifting the plunger 17 and head 18 thereof. The head 18, as best shown in Fig. 1 of the drawings, is laterally extended, and is cut away to form a saddle-like upper surface, the object being to permit the outer edges of the head 18 each to bear on one of the leaves 16 of the cover, to force the same against the gasket 21, and to close the neck 14, thereby restraining the contents of the cuspidor from flowing therefrom when overturned or tilted by accident or awkwardness in handling.

Thus it will be seen that when the cuspidors are collected by an attendant, the cover is closed on the neck 14 whenever the cuspidor is lifted from the floor. When the cuspidor has been moved to the washing station provided, the pan 11 is disengaged from the neck 15, and the saddles 20 are free. The leaves 16 are folded until the attendant may lift the shaft 19 from the saddles 20, to remove the cover preparatory to emptying the bowl, and to washing the same. After the parts of the cuspidor have been thoroughly cleansed, the cover is placed in position, the shaft 19 resting in the saddles 20. The pan 11 is then introduced into service position, forcing the shaft 19 into the saddles 20. The cuspidor is now in position to be replaced in its service relation, where, when the same is resting on the floor, the plunger 22 is lifted, and the plunger 17 depressed, as shown in Figs. 1 and 2 of the drawings.

Claims:

1. A cuspidor, comprising a bowl having a top opening surrounded by a vertical annular flange; a rim upwardly and outwardly flared, having an open centered neck fitting within said flange; a shaft extending across the center of the opening in said rim; a plurality of leaves pivotally mounted on said shaft to form a closure member in said rim; means for spreading said leaves to close the opening in said rim, said means embodying a plunger reciprocatively mounted in said bowl to extend through the bottom thereof; and means operatively connecting said plunger and said leaves to close said leaves when said plunger is moved within said bowl.

2. A cuspidor, comprising a bowl having a top opening surrounded by a vertical annular flange; a rim upwardly and outwardly flared, having an open-centered neck fitting within said flange; a shaft extending across the center of the opening in said rim; a plurality of leaves pivotally mounted on said shaft to form a closure member in said rim; means for spreading said leaves to close the opening in said rim, said means embodying a plunger reciprocatively mounted in said bowl to extend through the bottom thereof; means operatively connecting said plunger and said leaves to close said leaves when said plunger is moved within said bowl; and a plurality of upwardly opening saddle sockets mounted on said bowl below said rim to hold the ends of said shaft, whereby the leaves and shaft may be removed from said bowl for removing the said rim.

In testimony whereof I have signed my name to this specification in the presence of two subscribing witnesses.

STEVEN MÁYER.

Witnesses:
FRANK KRICH,
JOSZEF DURFUS.

---

Copies of this patent may be obtained for five cents each, by addressing the "Commissioner of Patents, Washington, D. C."